United States Patent [19]

Shepard

[11] Patent Number: 5,262,627
[45] Date of Patent: Nov. 16, 1993

[54] SCANNING ARRANGEMENT AND METHOD

[75] Inventor: Howard Shepard, Great River, N.Y.

[73] Assignee: Symbol Technologies, Inc., Bohemia, N.Y.

[21] Appl. No.: 812,923

[22] Filed: Dec. 24, 1991

Related U.S. Application Data

[63] Continuation-in-part of Ser. No. 520,464, May 8, 1990, Pat. No. 5,168,149, which is a continuation-in-part of Ser. No. 428,770, Oct. 30, 1989, Pat. No. 5,099,110.

[51] Int. Cl.$^5$ .............................................. G06K 7/10
[52] U.S. Cl. ...................................... 235/472; 235/467
[58] Field of Search ............... 235/462, 467, 470, 472; 359/196, 198, 199, 212, 213, 214, 224, 225

[56] References Cited

U.S. PATENT DOCUMENTS

| | | | |
|---|---|---|---|
| 1,202,446 | 10/1916 | Speed | 310/38 |
| 1,552,186 | 9/1925 | Anderson | 73/653 |
| 1,800,601 | 4/1931 | Centeno | 358/208 |
| 1,873,926 | 8/1932 | Centeno | 358/208 |
| 2,971,054 | 2/1961 | Holt, Jr. | 358/87 |
| 2,989,643 | 6/1961 | Scanlon | 250/230 |
| 3,087,373 | 4/1963 | Poor et al. | 250/230 |
| 3,532,408 | 10/1970 | Dostal | 350/6 |
| 3,642,343 | 2/1972 | Tchejeyan et al. | 350/6 |
| 3,981,556 | 9/1976 | Sabatelli et al. | 339/275 T |
| 3,981,566 | 9/1976 | Frank et al. | 350/285 |
| 3,998,092 | 12/1976 | Maccabee | 73/71.3 |
| 4,021,096 | 5/1977 | Dragt | 350/6 |
| 4,175,832 | 11/1979 | Umeki et al. | 350/285 |
| 4,199,219 | 4/1980 | Suzuki et al. | 350/6.1 |
| 4,251,798 | 2/1981 | Swartz et al. | 340/146.3 |
| 4,256,364 | 3/1981 | Minoura et al. | 350/6.9 |
| 4,360,798 | 11/1982 | Swartz et al. | 340/146.3 |
| 4,369,361 | 1/1983 | Swartz et al. | 235/470 |
| 4,387,297 | 6/1983 | Swartz et al. | 235/462 |
| 4,409,470 | 10/1983 | Shepard et al. | 235/472 |
| 4,496,831 | 1/1985 | Swartz et al. | 235/472 |
| 4,593,186 | 6/1986 | Swartz et al. | 235/472 |
| 4,632,501 | 12/1986 | Glynn | 350/6.6 |
| 4,705,365 | 11/1987 | Wakita et al. | 350/486 |
| 4,732,440 | 3/1988 | Gadhok | 350/6.6 |
| 4,808,804 | 2/1989 | Krichever et al. | 235/462 |
| 4,816,660 | 3/1989 | Swartz et al. | 235/472 |
| 4,816,661 | 3/1989 | Krichever et al. | 235/472 |
| 4,871,904 | 10/1989 | Melitsky et al. | 235/467 |
| 4,902,083 | 2/1990 | Wells | 350/6.6 |
| 4,919,500 | 4/1990 | Paulsen | 350/6.6 |
| 4,962,980 | 10/1990 | Knowles | 235/467 |
| 4,974,918 | 12/1990 | Delache et al. | 350/6.6 |

FOREIGN PATENT DOCUMENTS

0471291A2 7/1991 European Pat. Off.

OTHER PUBLICATIONS

Reich, "The Use of Electro-Mechanical Mirror Scanning Devices," SPIE vol. 84 Laser Scanning Components & Techniques, pp. 47-55 (1976).

Primary Examiner—Eugene R. LaRoche
Assistant Examiner—Tan Nguyen

[57] ABSTRACT

A scanning arrangement located within a scanning device which is operative for repetitively scanning indicia having parts of different light reflectivity, for example, bar code symbols, and more particularly, pertains to a novel scanning motor of the arrangement for enabling a scan element which is supported by a holder structure mounted on a mylar motor to implement angular oscillatory movements in a linear scan direction between a pair of scan end positions. Hereby, pursuant to the structure of the scanning device, the scanning arrangement is preferably mounted on a single printed circuit board located within a lightweight scanning device of a hand-held housing of gun-shaped configuration which may be readily held and manipulated by a user of the scanning device. The structure of the scanning motor and of the scanning arrangement which are mounted on a printed circuit board is considerably simplified through the construction of the various components being essentially of molded plastic material, and through the utilization of a mylar leaf spring which limits the end scan positions of a scan element or mirror which is oscillated by a read-start device including a permanent magnet mounted on an arm of the holder for the scan mirror.

48 Claims, 7 Drawing Sheets

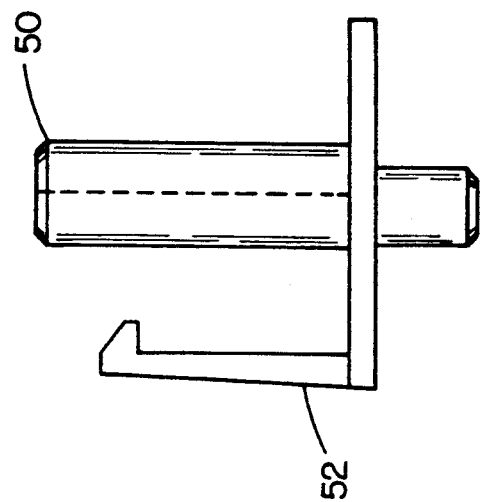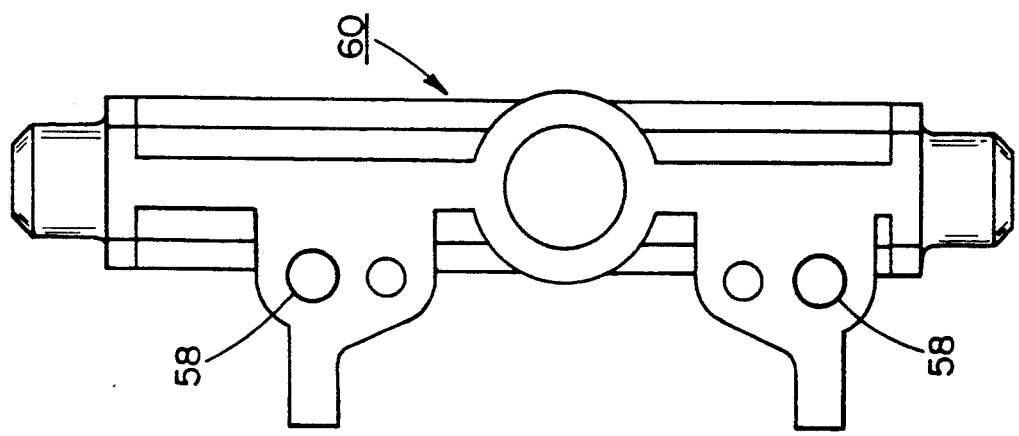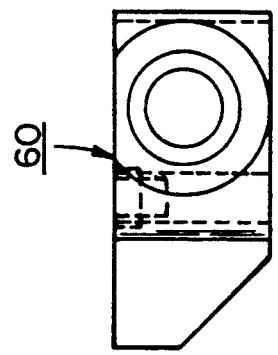

5,262,627

SCANNING ARRANGEMENT AND METHOD

CROSS-REFERENCE TO RELATED APPLICATIONS

This application is a continuation-in-part application of Ser. No. 520,464, filed May 8, 1990, now U.S. Pat. No. 5,168,749, issued Dec. 1, 1992; which is a continuation-in-part application of Ser. No. 428,770, filed Oct. 30, 1989, now U.S. Pat. No. 5,099,110, issued Mar. 24, 1992.

BACKGROUND OF THE INVENTION

1. Field of the Invention

Generally, the present invention relates to a scanning arrangement located within a scanning device which is operative for repetitively scanning indicia having parts of different light reflectivity, for example, bar code symbols, and more particularly, pertains to a novel scanning motor of the arrangement for enabling a scan element which is supported by a holder structure mounted on the motor to implement angular oscillatory movements in a single scan direction between a pair of scan end positions. Hereby, pursuant to the inventive structure of the scanning device, the scanning arrangement is preferably mounted on a single printed circuit board located within a small, lightweight scanning device, which is to be implemented wither as a fixed mount scanner or in a hand-held configuration which may be readily held and manipulated by a user of the scanning device.

The utilization of laser scanning devices for the scanning and reading of information provided on a target; such as a package or sale item, is well known in this particular technology and has found wide acceptance in commerce. In this connection, various types of laser scanning devices incorporate scanning heads which house optical reading systems, such as bar code readers, for the reading of information or bar code symbols on targets which are scanned by a laser beam projected from the bar code reader. In general, such laser scanning devices; especially those in the type of bar code readers, are widely employed in industry, such as manufacturing, shipping, and in retail commerce and; for example, may be permanently incorporated in the structures of check-out counters of supermarkets, whereby the items of merchandise having the bar code symbols imprinted thereon or applied thereto are passed over a fixed bar code reader located beneath the counter surface so as to provide a record for the merchant of the merchandise being purchased by a consumer, and concurrently a readout (and possibly a printed record) for the consumer.

Alternatively, the bar code reader or laser scanning device may also be constituted of an optical scanner unit which is fixedly mounted on a stand extending above a support platform or countertop on which the merchandise may be arranged; or in many instances of utilization, pursuant to a preferred embodiment of the invention, may be in the form of a miniature, lightweight and gun-shaped device having a pistol grip, and which the activated device is normally passed over the bar code symbol which is imprinted on a sale item or target at some short distance therefrom so as to enable scanning of the information provided by the bar code symbols.

2. Discussion of the Prior Art

Various optical readers and optical scanning systems have been developed heretofore for reading bar code symbols appearing on a label or on the surface of an article. The bar code symbol itself is a coded pattern of indicia comprises of a series of bars of various widths spaced apart from one another to bound spaces of various widths, the bars and spaces having different light-reflecting characteristics. The readers and scanning systems electro-optically transform the graphic indicia into electrical signals, which are decoded into alphanumerical characters that are intended to be descriptive of the article or some characteristic thereof. Such characters are typically represented in digital form and utilized as an input to a data processing system for applications, in point-of-sale processing, inventory control, and the like. Scanning systems of this general type have been disclosed, for example, in U.S. Pat. Nos. 4,251,798; 4,369,361; 4,387,297; 4,409,470; 4,760,248; and 4,896,026, all of which have been assigned to the same assignee as the instant application.

Among the foregoing, and in addition thereto, of particularly advantageous construction is a scan board module for laser scanners as illustrated and claimed in U.S. Pat. No. 5,015,833, which has also been assigned to the same assignee as the instant application, and the disclosure of which is incorporated herein by reference. In this connection, U.S. Pat. No. 5,015,833 discloses a scan board module contained in a generally lightweight hand-held gun-shaped housing which includes a printed circuit board on which optical and scanning components are mounted in an optically-aligned operative relationship. The printed circuit board is mounted in a manner within the housing, and the operative scanner components thereon are fastened thereto such that they are protected from damage caused by impacts or shocks sustained during rough handling or possible dropping of the scanning device Moreover, the modular mounting of the various operative components on a single printed circuit board as disclosed and shown in this patent, as well as that elucidated particularly with regard to the embodiment of FIG. 2 of the co-pending U. S. patent application 520,464 of which the present application is a continuation-in-part, allows for a simple and highly efficient construction and functioning of the scanning arrangement.

As disclosed in some of the above patents, one embodiment of such a scanning system resides, inter alia, in a hand-held, portable laser scanning head supported by a user, which is configured to allow the user to aim the head, and more particularly, the light beam or laser beam projected therefrom, at a target and a symbol which is to be read.

The light source in a laser scanner is typically a gas laser or semiconductor laser. The use of semiconductor devices, such as a laser diode, as the light source in scanning systems is especially desirable because of their small size, low cost and low power requirements. The laser beam is optically modified, typically by a lens, to form a beam spot of a certain size at the target distance. It is preferred that the beam spot size at the target distance be approximately the same as the minimum width between regions of different light reflectivity, i.e., the bars and spaces of the symbol Bar code symbols are formed from bars or elements that are typically rectangular in shape with a variety of possible widths. The specific arrangement of elements defines the character represented according to a set of rules and definitions specified by the code or "symbology" used. The relative size of the bars and spaces is determined by the type of coding used, as is the actual size of the bars and spaces. The number of characters per inch represented by the bar code symbol is referred to as the density of the symbol. To encode a desired sequence of characters, a collection of element arrangements are concatenated together to form the complete bar code symbol, with each character of the message being represented by its own corresponding group of elements In some symbologies a unique "start" and "stop" character is used to indicate where the bar code begins and ends. A number of different bar code symbologies exist These symbologies include UPC/EAN, Code 39, Code 128, Codabar, and Interleaved 2 of 5.

For purpose of discussion, characters recognized and defined by a symbology shall be referred to as legitimate characters, while characters not recognized and defined by that symbology are referred to as illegitimate characters. Thus, an arrangement of elements not decodable by a given symbology corresponds to an illegitimate character(s) for that symbology.

In order to increase the amount of data that can be represented or stored on a given amount of surface area, several new bar code symbologies have recently been developed. One of these new code standards, Code 49, introduces a "two-dimensional" concept by stacking rows of characters vertically instead of extending the bars horizontally. That is, there are several rows of bar and space patterns, instead of only one row. The structure of Code 49 is described in U.S. Pat. No. 4,794,239, which is hereby incorporated by reference.

A one-dimensional single-line scan, as ordinarily provided by hand-held readers, has disadvantages in reading these two dimensional bar codes; that is, the reader must be aimed at each row, individually. Likewise, the omnidirectional scan-line readers produce a number of scan lines at an angle to one another so these are not suitable for recognizing a Code 49 type of two-dimensional symbols.

Moreover, Wells U.S. Pat. No. 4,902,083 discloses a low vibration resonance scanning unit for miniature optical display apparatus, in which a resonance scanning unit employs a so-called tuning fork design. A scan mirror is mounted on one arm of a tuning fork, and a counter-balancing mass is mounted on the other arm of the tuning fork. Although this provides for the oscillation of the scan mirror to generate a raster display, the structure is relatively complex in nature and necessitates a plurality of components to produce the scanning operation.

In the scanning systems known in the art, the light beam is directed by a lens or similar optical components along a light path toward a target that includes a bar code symbol on the surface. The scanning functions by repetitively scanning the light beam in a line or series of lines across the symbol. The scanning component may incorporate a drive or scanning motor adopted to either sweep the beam spot across the symbol and trace a scan line across and past the symbol in a high-speed repetitive mode, or scan the field of view of the scanner, or do both.

Scanning systems also normally include a sensor or photodetector which functions to detect light reflected from the symbol. The photodetector is therefore positioned in the scanner or in an optical path in which it has a field of view which extends across and slightly past the symbol. A portion of the reflected light which is reflected off the symbol is detected and converted into an electrical signal, and electronic circuitry or software decodes the electrical signal into a digital representation of the data represented by the symbol that has been scanned. For example, the analog electrical signal from the photodetector may typically be converted into a pulse width modulated digital signal, with the widths corresponding to the physical widths of the bars and spaces. Such a signal is then decoded according to the specific symbology into a binary representation of the data encoded in the symbol, and to the alphanumeric characters so represented.

The decoding process in known scanning systems usually work in the following way. The decoder receives the pulse width modulated digital signal from the scanner, and an algorithm implemented in software attempts to decode the scan. If the start and stop characters and the characters between them in the scan were decoded successfully and completely, the decoding process terminates and an indicator of a successful read (such as a green light and/or an audible beep) is provided to the user. Otherwise, the decoder receives the next scan, performs another decode attempt on that scan, and so on, until a completely decoded scan is achieved or no more scans are available.

Laser scanners are not the only type of optical instrument capable of reading bar code symbols. Another type of bar code reader is one which incorporates detectors based upon charge coupled device (CCD) technology. In such readers, the size of the detector is larger than or substantially the same as the symbol which is to be read The entire symbol is flooded with light from the reader, and each CCD cell is sequentially read out to determine the presence of a bar or a space. Such readers are lightweight and easy to use, but require substantially direct contact or placement of the reader on the symbol to enable the symbol to properly read. Such physical contact of the reader with the symbol is a preferred mode of operation for some applications, or as a matter of personal preference by the user.

SUMMARY OF THE INVENTION

Although the scanning arrangement disclosed in U.S. Pat. No. 5,015,833 and in FIG. 2 of the copending U.S. patent application No. 520,464 provide distinct advantages over the state-of-the-art in the modular arrangement of scanning and optical components on a single support surface, such as a printed circuit board, the present invention contemplates a further improvement thereto in that the structure of the scanning motor and of the scanning arrangement which are mounted on a printed circuit board is considerably simplified through the construction of the various components being essentially of molded plastic material, and through the utilization of a Mylar leaf spring which positions a generally flat scan element or mirror which is oscillated by a read-start device including a permanent magnet mounted on an arm of the holder for the scan mirror. The leaf spring consisting of Mylar which will provide for a high degree of strength and flexibility so as to enable the scanning arrangement to be operated at the desired level of efficiency. Moreover, the inventive structure utilizing essentially all molded plastic components for the scanning arrangement, and with the leaf spring being constituted form Mylar, is inexpensively yet efficiently constructed, easily assembled on a printed circuit board which is mounted in the scanning device, highly shock and damage-resistant, while being readily exchangeable with similar components during servicing of the scanning device.

The reason Mylar is preferred instead of metal spring material is that its very low modulus of elasticity permits relatively low resonant frequencies without the strip getting impractically thin. It is also more difficult to accidently damage Mylar than thin metal springs during assembly. Mylar can be deformed more than metal during drop or shock without being permanently deformed.

With respect to the foregoing, the scanning arrangement essentially incorporates a so-called Mylar motor, whereby, mounted on a printed circuit board also supporting the optical system and light or laser beam generating device, there is mounted support structure in the form of brackets having extending generally resiliently flexible arms, and in which a rotatable post supported in a trunnion fastened to the lower surface of the printed circuit board mounts a scan mirror. Additionally, a bracket having an extending arm to which a permanent magnet is fastened at an outer end thereof, has the opposite end fastened to the rotatable post, and moreover the center of a leaf spring constituted of Mylar is fastened to the post, with the opposite distant ends of the Mylar leaf spring being attached to the free ends of the resilient or flexible arms of the bracket mounting the foregoing arrangement. An electrically activated electromagnetic coil is adapted to alternately attract and repel the permanent magnet so as to impart oscillatory motion to the arm mounting the bracket, and resultingly to the upstanding post supporting the scan mirror. The oscillatory movement imposed by the magnet and electrically energized coil, the latter of which constitute a read-start device, is counter-balanced by the Mylar spring which generates the oscillatory movement of the scan mirror. As a consequence, the scan mirror moves between predetermined end positions while tending to normally return to a central position intermediate the two end positions.

The Mylar motor is operated at its own natural frequency. This frequency is determined by the stiffness of the spring and the inertia of the moving parts (including the mirror, the magnet, the magnet arm, etc.) A drive circuit is used that synchronizes itself to this natural frequency. The circuitry also controls the scan angle by monitoring the voltage generated in a secondary winding in the drive coil. Drive current is adjusted automatically to maintain a preset scan angle.

Accordingly, it is an object of the present invention to provide a scanning arrangement including a novel scanning motor in a scanning device of the type described in which the components of a scanning arrangement are modularly mounted on a single support structure.

A more specific object of the present invention resides in the provision of a scanning arrangement in a generally small, lightweight scanning device which is includes a read-start constituent for a scan element modularly mounted on a printed circuit board contained in a housing of the scanning device so as to be essentially resistent to external shock and impact forces imposed thereon.

Yet, another object of the invention is to protect the Mylar spring from shock by mounting it on bendable arms and limiting its travel via stops located near the rotating post.

Yet another object of the present invention is to provide a method of utilizing a novel scanning arrangement pursuant to the present invention.

BRIEF DESCRIPTION OF THE DRAWINGS

The foregoing features and other advantages of the invention may now be more readily ascertained from the following detailed description of an exemplary embodiment thereof, taken in conjunction with the accompanying drawings; in which:

FIG. 8 illustrates a plan view of a trunnion for mounting the support structure of FIG. 7 on a printed circuit board;

FIG. 9 illustrates an end view of the trunnion of FIG. 8;

FIG. 10 illustrates an elevational view of a post and bracket structure for attaching the scan mirror and portion of the scanning motor to the support bracket;

FIG. 10a illustrates a cross-sectional view through the post of FIG. 10;

DETAILED DESCRIPTION OF PREFERRED EMBODIMENT

Figure 2:
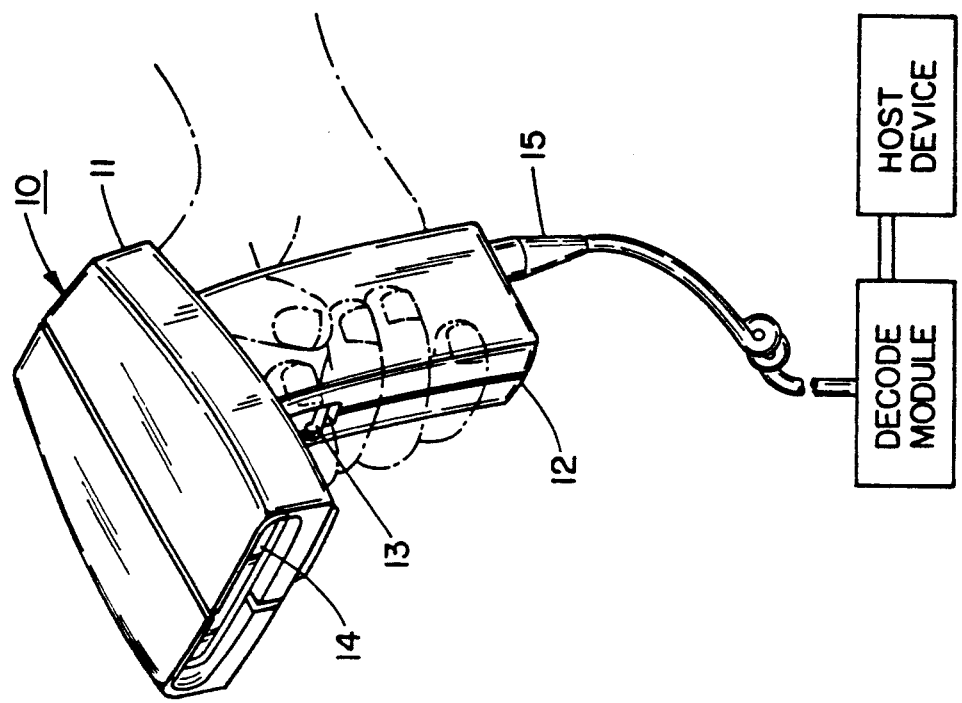
FIG. 2 illustrates a front perspective view of the scanning device of FIG. 1 during operation thereof, schematically connected to other components of a laser scanning system.
Figure 1:
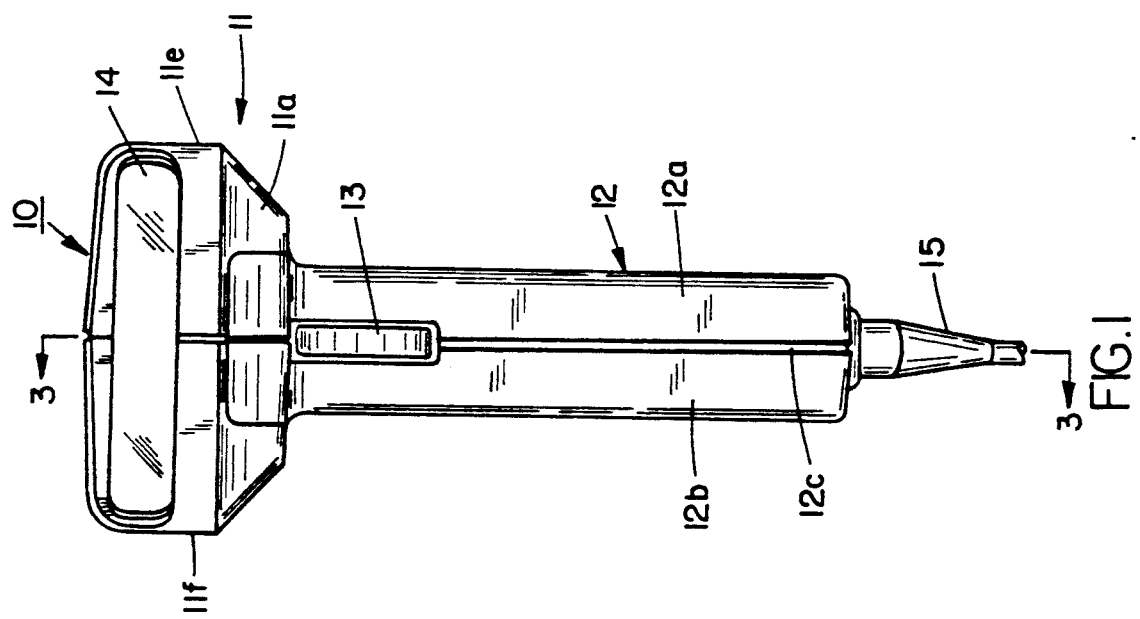
FIG. 1 illustrates a front view of a scanning device in the form of a hand-held, gun-shaped laser scanning head constructed pursuant to the invention.
Figure 3:
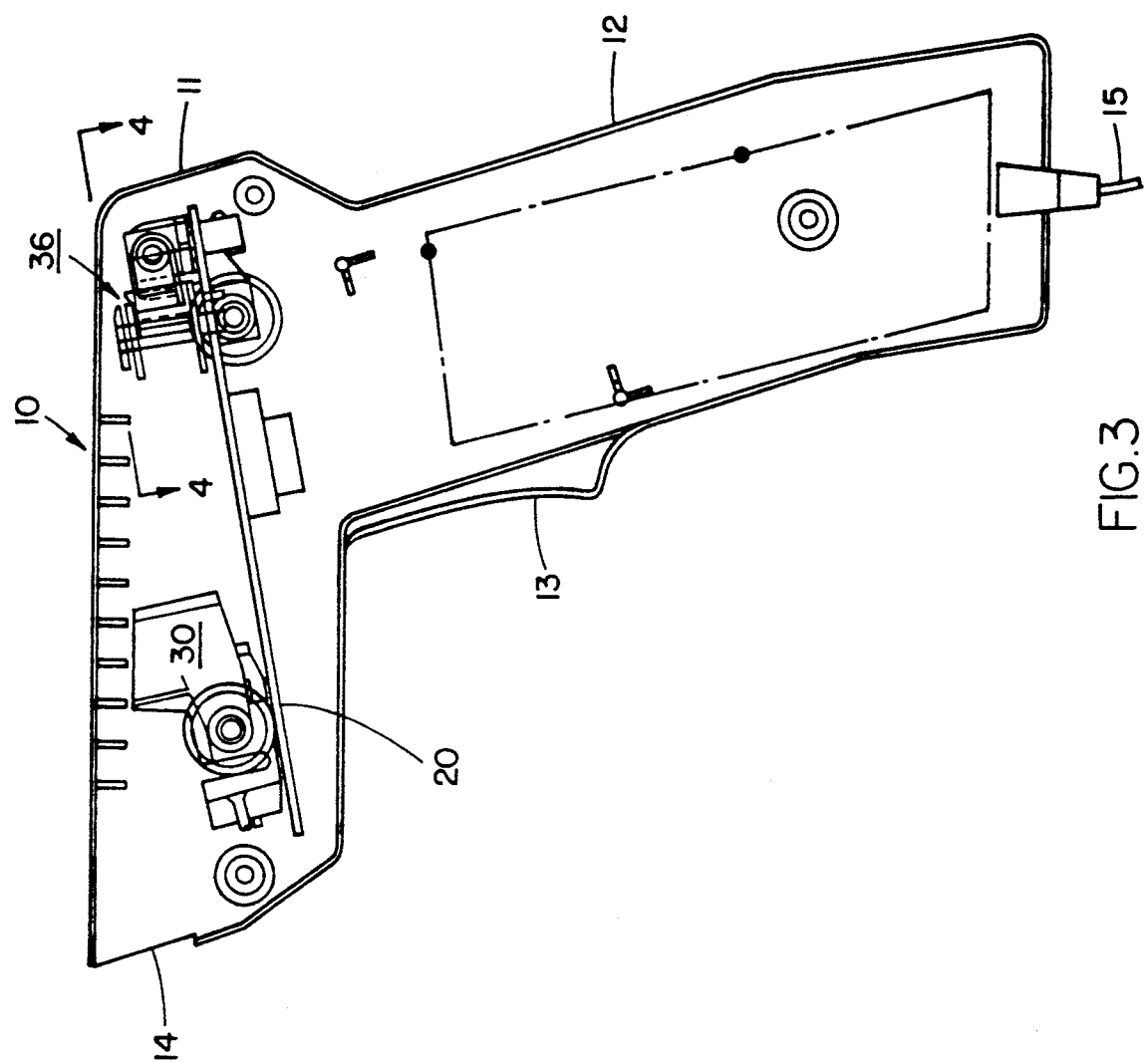
FIG. 3 illustrates a sectional view taken along line 3—3 in FIG. 1.

Referring now more specifically to the drawings, and particularly FIGS. 1 to 3, the invention relates to a laser scanning device of which is readily adapted for reading, scanning and/or analyzing symbols, for example, bar code symbols or any of the symbols as detailed hereinbefore.

Turning now to FIG. 1, there is illustrated one embodiment of the present invention in the form of a generally hand-held reading head 10 that includes a generally gun-shaped housing having a handle portion 12 of generally rectangular cross-section and generally elongated along a handle axis, and a generally horizontally-elongated barrel or body portion 11. The cross-sectional dimension and overall size of the handle portion 12 is cut that the head 10 conveniently can fit and be held in a user's hand. The body and handle portions are constituted of a lightweight, resilient, shock-resistant, self-supporting material, such as a synthetic plastic material. The plastic housing preferably is injection-molded, but can be vacuum-formed or blow-molded to form a thin, hollow shell which bounds an interior space whose volume measures less than a value on the order of 50 cubic inches and, in some applications, the volume is on the order of 25 cubic inches or less. Such specific values are not intended to be self-limiting, but to provide a general approximation of the overall maximum size and volume of the head 10. The shell is formed of two housinq parts 12a, 12b meeting along a generally vertical joining line 12c.

As considered in an intended position of use as shown in FIG. 2, the body portion 11 has a front prow region or nose having an inclined front wall 11a. The body portion 11 also has a rear region or stern having a rear wall 11b spaced rearwardly of the inclined front wall 11a. The body portion 11 also has a top wall 11c, and a pair of opposed side walls 11e, 11f between the top and bottom walls. The front wall 11a is sloped relative to the top and bottom walls.

A manually-actuatable, and preferably depressible, trigger 13 is mounted for movement relative to the head in a forwardly-facing region where the handle and body portions meet and where the user's forefinger normally lies when the user grips the handle portion in the intended position of use.

A window 14 is stationarily mounted at the nose and is light-transmissive to allow laser light to pass from the interior to the exterior of the head, and vice versa.

A flexible, non-bulky, coil-type electrical cable 15 with multiple freedoms of movement interconnects the head 10 to the remainder of the components of the laser scanning system, such as a decode module and host device, as is known in the art.

A plurality of components are mounted in the head and, as explained below, at least some of them are actuated by the trigger 13, either directly or indirectly, by means of a control microprocessor. One of the head components may be an actuatable laser light source (see FIG. 3). e.g. such as a semiconductor laser diode, operative, when actuated by the trigger 13, for propagating and generating an incident laser beam whose light, as explained above, is at least marginally visible to the human eye. The emitted laser diode beam is highly divergent; diverges differently in different planes parallel and perpendicular to the longitudinal direction of beam propagation; is non-radially symmetrical, i.e. anamorphic; and has a beam cross-section resembling an oval. The diode may be of the continuous wave or pulse type. The diode requires a low voltage (e.g. 12 v DC or less) supplied by a power regulator and a battery (DC) source which may be provided within the head, or by a rechargeable battery pack accessory detachably mounted on the head, or by a power conductor in the cable 15 connected to the head from an external power supply (e.g. DC source). Diodes which emit laser light or different wavelengths are also within the scope of this invention.

Although the embodiment illustrated in FIGS. 1 and 2 is a hand-held one, the present invention may also be implemented in a fixed mount, tabletop, or other configurations.

Having reference to the cross-sectional view shown in FIG. 3, an optical assembly 30 is mounted in the device on a thin-flexible printed circuit board 20, and is adjustably positioned relative to the board for optically modifying and directing the emitted light or laser beam along a specified optical path towards a reference plane which is located exteriorly of the device. A symbol to be read may be arranged in the vicinity of the reference plane, at the reference plane, or towards one side or at an opposite side thereof, in essence, anywhere within the depth of field of the applicably modified laser beam and within a range of working distances as measured relative to the laser device. Hereby, the light or laser beam reflects off the symbol as a specular component in one direction and as a scattered component in many directions, and that portion of the scattered laser light which travels along a second optical path away from the symbol back towards the scanning device is referred to as the returning light portion and is employed for providing the information relative to that provided on the symbol.

Figure 3A:
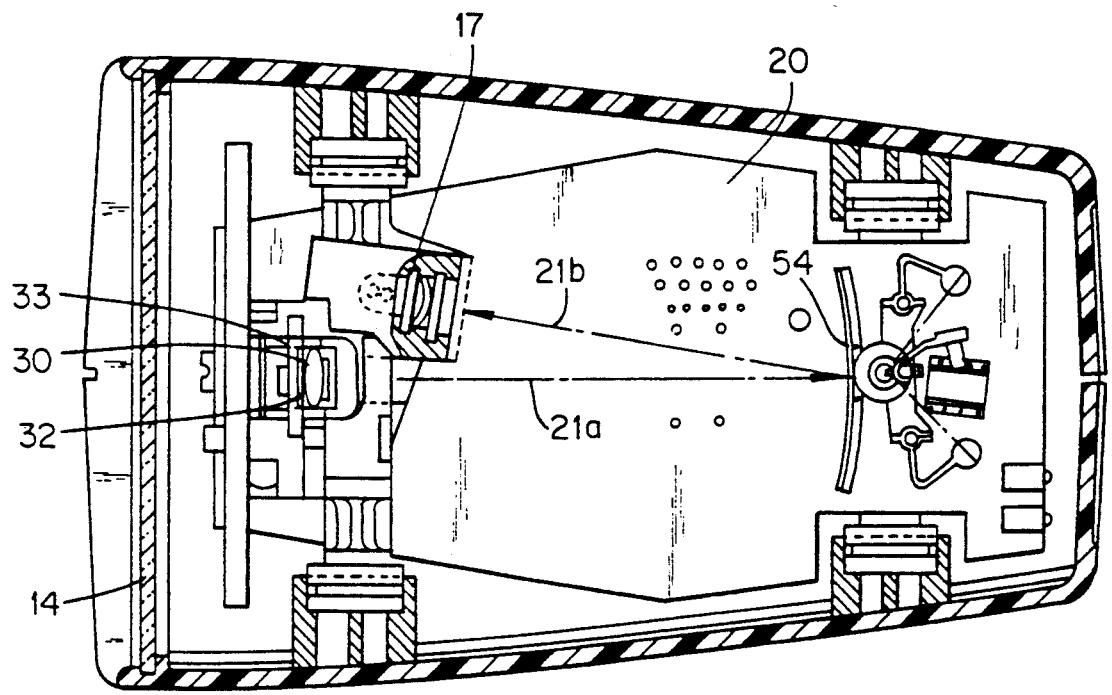
FIG. 3a is an enlarged plan sectional view showing the layout of the optical assembly, the photosensor and the scanning arrangement on the circuit board.

As shown in FIG. 3a, the optical assembly 30 may be similar to or identical with that disclosed in U.S. Pat. No. 5,015,833, which is commonly assigned to the assignee of the present application and is incorporated herein by reference. Consequently, with the exception of relatively general comments, it is not considered to be necessary to repeat all of the information and details concerning the optical assembly. However, as is well known in this technology, the optical assembly 30 may be constituted of a focusing lens, 32 probably in the configuration of a plano-convex lens, and cooperating with an aperture for focusing the emitted laser or light beam at a reference plane. Suitable springs for adjusting the lens and other components may be incorporated in the optical assembly, including a light generating source, such as a laser diode 33 for producing the required light to be projected against a scanning arrangement 36, pursuant to the present invention described in detail hereinbelow. Light beam 21a from the laser diode 33 reflects off of the mirror 54, passes above the optical asssembly 30 and exits from the scanner via the window 14. Light reflected from the scanned surface on which a symbol appears enters the scanner through the window 14 and reflects off of the mirror 54 along path 21b to impact the photosensor 17.

Figure 4:
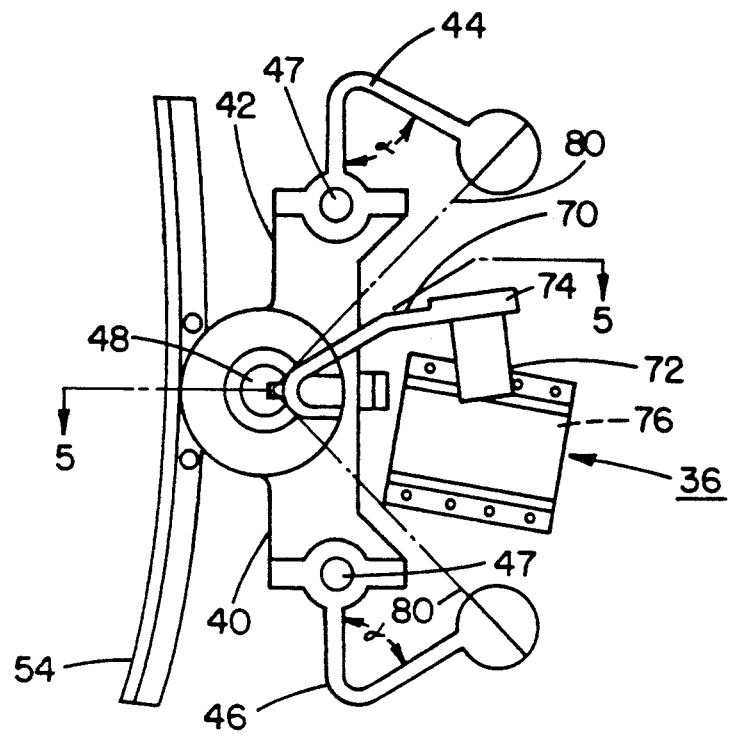
FIG. 4 illustrates, on an enlarged scale, a sectional view through a portion of a printed circuit board having the scanning arrangement with a scanning motor constructed pursuant to the invention mounted thereon, taken along line 4—4 in FIG. 3.
Figure 5:
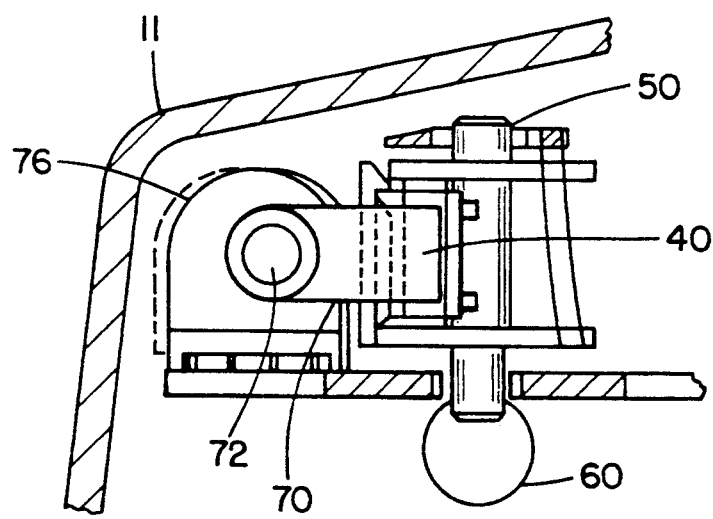
FIG. 5 illustrates a sectional view taken along line 5—5 in FIG. 4.
Figure 7:
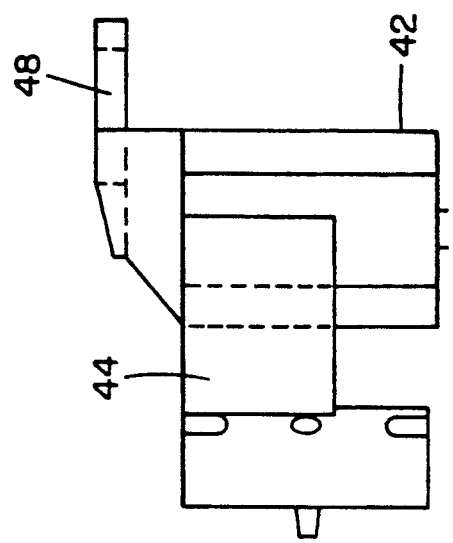
FIG. 7 illustrates an elevational end view of the support structure of FIG. 6.
Figure 6:
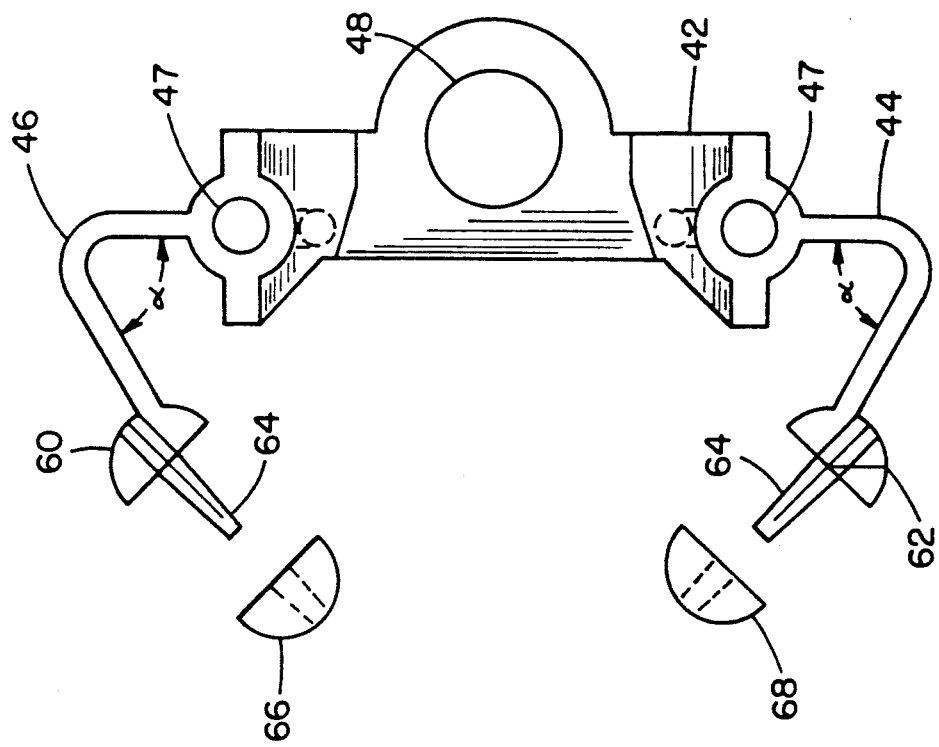
FIG. 6 illustrates a top plan view of the support member for mounting the scan mirror and the scanning motor components including a mylar leaf spring.
Figure 13:
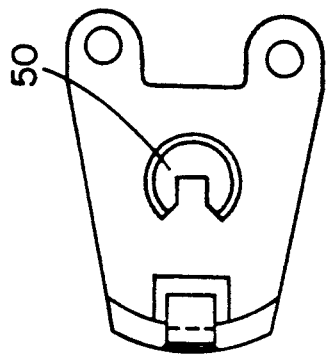
FIG. 13 illustrates a top plan view of the post and bracket arrangement for mounting the scan mirror fastening the scanning motor.

Referring now more specifically to the assembled components of the scanning arrangement as shown in FIGS. 4 and 5 of the drawings, the arrangement 36 includes an upstanding support member 40, as shown in FIGS. 6 and 7, having a central portion in the shape of an elongate bracket 42 with extending generally L-shaped bent arms 44, 46 projecting from its opposite ends, each of the arm subtending an acute angle $\alpha$. The elongate generally rectangular bracket 42 is mounted on the printed circuit board 20 through the intermediary of suitable fasteners (not shown) extending through holes 47 formed in the ends of the bracket and engaging into threaded bores 58 of a trunnion 60 and includes an apertured central portion 48 for the swivable support of a post 50, as illustrated in FIG. 10, having a lower end extending through the board 20, as shown in FIGS. 8 and 9, positioned to extend across the lower surface of the printed circuit board 20. The post 50 includes a bracket member 52 to which there is fastened a suitable scan element 54, such as a flat scan mirror through fastener elements extending so as to be oscillatable about an axis y extending coaxially through the post.

Fastened to the post 50 is a projecting arm member 70 having a magnet 72 mounted on the outer distal end 74 of the arm member, which magnet is adapted to be electrically alternatingly attracted to or repelled from the interior of an electrically energized and electromagnetic coil structure 76 mounted on the printed circuit board 20 by being movable into and out of an aperture in the coil, thereby resultingly oscillating the arm member 70 and post 50 and imparting a reciprocating oscillatory movement to the scan mirror 54.

Figure 14:
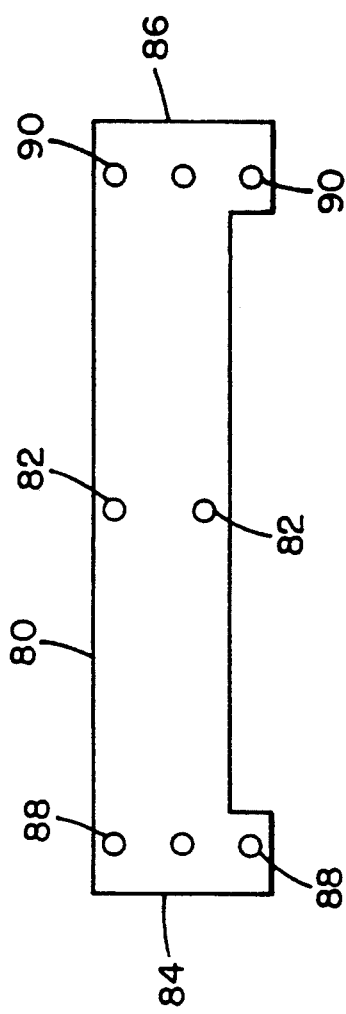
FIG. 14 illustrates a front view of the mylar leaf spring.
Figure 11:
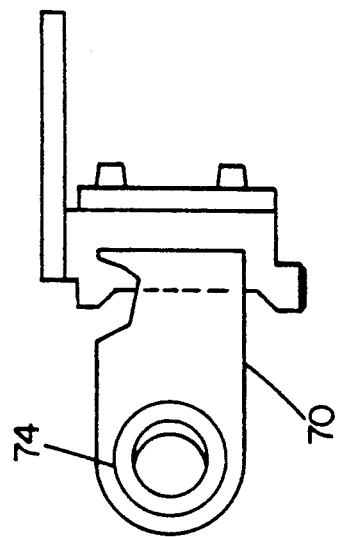
FIG. 11 illustrates an elevational side view of the arm and bracket for attaching the magnet component of the scanning motor to the attaching post for the scan mirror.
Figure 12:
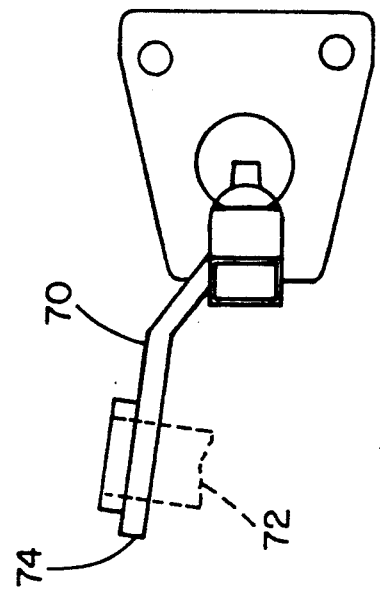
FIG. 12 illustrates a top plan view of the scan motor attachment shown in FIG. 11.

In order to properly position the scan mirror 54, and to essentially restore or bias the scan mirror towards its centered position, the distal ends of each of the bent arm members 44, 46 of the structure bracket 42 are provided with clamping components, such as in the shape of in cross-section hemispherical cylindrical extensions 60, 62 having projecting dowels 64 cooperating with complementary clamping members 66, 68 adapted to be fastened thereon. Extending through a notch portion 80 formed in the post 50, and also in engagement with the arm supporting the magnet, is a flat leaf spring 80 constituted from a sheet of Mylar (a trademark for a plastic film. As shown in FIG. 14 of the drawings, the central portion of the Mylar leaf spring 80 has holes 82 therein adapted to be engaged by fasteners or dowels extending from the arm mounting the magnet so as to clamp the spring to the rotatable post 50 supporting the scan mirror 54. The opposite ends 84, 86 of the Mylar spring each include holes 88, 90 adapted to engage over the dowels 64 extending between the respective hemispherically cross-sectional clamping elements 60, 66; 62, 68 at the outer ends of the arms 44, 46 so as to be fixedly engaged therebetween. Hereby, the spring is bent into two arm segments, for example, at a right angle or 90° to each other extending from the attachment to the post 50 towards each end 84, 86, while positioned by the bent arm members 44, 46. This will provide a resilient biasing restoring action on the scan mirror 54 opposite the oscillatory movement imparted to the scan mirror by the energizing effect imposed on the magnet, thereby reciprocating the mirror between its end positions. In effect, during the operation of the scanning arrangement, each time an energizing pulse is applied to the coil, the magnet is drawn into the central opening or aperture into the coil, thereby pulling all of the oscillatable components therewith, and concurrently bending the leaf spring. As illustrated in FIG. 4 of the drawings, each of the arms of the leaf spring is generally planar, while upon being displaced responsive to the oscillation of the magnet, each arm of the leaf spring is bent so as to store energy therein. Upon being bent, the leaf spring then releases its stored energy, thereby displacing the magnet and the scan mirror back into and past its centered normal at rest position, with the entire assembly oscillating in a damped manner. This particular structure thus ensures a controlled oscillation of the scan mirror between the two end positions thereof so as to afford a uniform scan operation for reading information on a target object.

With the exception of the construction of the leaf spring 80 being constituted from Mylar, the remaining components of the scanning arrangement 36 as set forth hereinabove, with the exception of the scan mirror, may consist of a molded plastic material; for example, such as lexan or the like, and in the simplicity of construction by modularly mounting the entire scanning arrangement on the printed circuit board 20 effectively protects the arrangement against externally produced shocks and impacts encountered during any possible dropping or rough handling of the scanning device while concurrently rendering the construction thereof inexpensive in nature and easily and quickly capable of being serviced.

From the foregoing, it readily appears to one skilled in the art that the scanning arrangement pursuant to the invention clearly and advantageously provides features which are not at all disclosed nor contemplated in the technology.

While there has been shown and described what are considered to be a preferred embodiment of the invention, it will of course be understood that various modifications and changes in form or detail could readily be made without departing from the spirit of the invention. It is therefore intended that the invention be not limited to the exact form and detail herein shown and described, nor to anything less than the whole of the invention herein disclosed as hereinafter claimed.

What is claimed is:

1. A scanning device for reading indicia having parts of different light reflectivity by directing a beam of light toward the indicia and collecting light reflected from the indicia; comprising:
   (a) a single printed circuit board fixedly positioned in said device;
   (b) light generating means and optical means mounted on said circuit board for producing and directing a focused beam of light; and
   (c) a scanning arrangement mounted on said circuit board in spaced relationship from said light generating and optical means, said scanning arrangement including means for mounting a scanning element for oscillatory movement; an upstanding support member fastened to said circuit board including a central portion having said scanning element mounting means connected therewith; scanning motor means operatively connected with said scanning element mounting means for imparting said oscillatory movement to said scanning element, said support member having extending arm members at opposite ends; and a resiliently flexible leaf spring extending between said arm members and said means connecting said scanning motor means and said scanning element so as to provide a restoring force opposite the force exerted by said scanning motor means for normally biasing said scanning element into a central position intermediate opposite oscillatory end positions.

2. A scanning device as claimed in claim 1, wherein said leaf spring is constituted from Mylar and the remaining components of said scanning arrangement are each constituted of a molded plastic material.

3. A scanning device as claimed in claim 1, wherein an end of each said arm member includes clamping means for grippingly engaging to an adjacently located end of said leaf spring.

4. A scanning device as claimed in claim 3, wherein said arm members are bent such that the ends extend towards each other, and said leaf spring forms an angled spring subtending an angle between the angled segments of said spring.

5. A scanning device as claimed in claim 1, wherein said arm members are flexible.

6. A scanning device as claimed in claim 5, wherein said arm members and said support member comprise an integrally molded unitary structure.

7. A scanning device as claimed in claim 5, wherein fastening means at the junctures between said arm members and the support member attach said structure to the circuit board.

8. A scanning device as claimed in claim 7, wherein said support member has a vertical central post portion having one end depending downwardly through an aperture in said circuit board; and trunnion means extending along the lower surface of said circuit board engaging said lower end of the post portion.

9. A scanning device as claimed in claim 8, wherein said scanning element mounting means is connected to said post portion for angular rotational movement relative thereto.

10. A scanning device as claimed in claim 1, wherein said scanning motor means comprises a permanent magnet mounted on an oscillatable arm connected to the mounting means for said scanning element; and electromagnetic coils on said circuit board for alternatingly attracting and repelling said magnet so as to oscillate said arm and resultingly oscillate said scanning element.

11. A scanning device as claimed in claim 10, wherein the center of said leaf springs is attached to said means for oscillating said permanent magnet.

12. A scanning device as claimed in claim 1, wherein said scanning element comprises a flat scan mirror.

13. A method of reading indicia having parts of different light reflectivity by directing a beam of light toward the indicia and collecting light reflected from the indicia through the intermediary of a scanning device; comprising:
 (a) fixedly positioning a single printed circuit board in said scanning device;
 (b) mounting light generating means and optical means mounted on said circuit board for producing and directing a focused beam of light; and
 (c) mounting a scanning arrangement on said circuit board in spaced relationship from said light generating and optical means, said scanning arrangement including means for mounting a scanning element for oscillatory movement; fastening an upstanding support member to said circuit board including a central portion having said scanning element mounting means connected therewith; operatively connecting scanning motor means with said scanning element mounting means for imparting said oscillatory movement to said scanning element, said support member having extending arm members at opposite ends; and positioning a resiliently flexible leaf spring to extend between said arm members and said means connecting said scanning motor means and said scanning element so as to provide a restoring force opposite the force exerted by said scanning motor means for normally biasing said scanning element into a central position intermediate opposite oscillatory end positions.

14. A method as claimed in claim 13, wherein said leaf spring is constituted from Mylar and the remaining components of said scanning arrangement are each constituted of a molded plastic material.

15. A method as claimed in claim 13, wherein an end of each said arm member includes clamping means for grippingly engaging an adjacently located end of said leaf spring.

16. A method as claimed in claim 15, wherein said arm members are bent such that the ends extend towards each other, and said leaf spring forms an angled spring subtending an angle between the angled segments of said spring.

17. A method as claimed in claim 13, wherein said arm members are resiliently flexible.

18. A method as claimed in claim 17, wherein said arm members and said support member comprise an integrally molded unitary structure.

19. A method as claimed in claim 17, wherein fastening means at junctures between said arm members and the support member attach said structure to the circuit board.

20. A method as claimed in claim 13, wherein said support member has a vertical central post portion having one end depending downwardly through an aperture in said circuit board; and trunnion means extending along the lower surface of said circuit board engaging said lower end of the post portion.

21. A method as claimed in claim 20, wherein said scanning element mounting means is connected to said post portion for angular rotational movement relative thereto.

22. A method as claimed in claim 13, wherein said scanning motor means comprises a permanent magnet mounted on an oscillatable arm connected to the mounting means for said scanning element; and electromagnetic coils on said circuit board for alternatingly attracting and repelling said magnet so as to oscillate said arm and resultingly oscillate said scanning element.

23. A method as claimed in claim 22, wherein of said leaf springs is attached to said means for oscillating said permanent magnet.

24. A method as claimed in claim 13, wherein said scanning element comprises a plano-concave scan mirror.

25. In a light beam scanning system having: a light source for emitting an incident beam of light along a path, means in the path of said incident beam for reflecting said incident beam, means for supporting said reflecting means for oscillatory movement about a pivot axis, said pivot axis being perpendicular to said incident beam, and means for initiating oscillatory movement of said reflecting means and said supporting means about the pivot axis, the improvement comprising:
 a non-metallic biasing element, extending between a pair of supports and having a portion intermediate the pair of supports which is coupled to said supporting means for biasing the supporting means to return said reflecting means toward a rest position intermediate opposite oscillation end position.

26. The improvement as described in claim 25, wherein said biasing element also functions as a shock absorbing element if the system is dropped or shocked.

27. An optical scanner comprising:
 a light source for emitting a beam of light along a path;
 an optical component in the path of the beam of light for redirecting the beam of light toward an object to be scanned;
 a rotatable pivot supporting the optical component so as to permit movement of the optical component about an axis of the pivot;
 means for initiating oscillatory motion of the optical component about an axis of the pivot;
 at least one fixed support spaced apart from the pivot; and
 a resilient non-metallic element connected to the at least one fixed support and coupled to said pivot, such that rotation of the pivot causes deformation of the resilient non-metallic element and produces a bias of the optical component toward a rest position intermediate extremes of the oscillatory motion.

28. An optical scanner as in claim 27, wherein:
the at least one fixed support comprises a first fixed support and a second fixed support,
a first portion of the resilient non-metallic element extends from the first fixed support to a point at which the resilient non-metallic element is coupled to the pivot, and
a second portion of the resilient non-metallic element extends from said point to the second fixed support.

29. An optical scanner as in claim 28, further comprising:
a printed circuit board supporting the light source, the rotatable pivot and the means for initiating oscillatory motion; and
a bracket mounted on the printed circuit board, wherein the first and second fixed supports are attached to said bracket.

30. An optical scanner as in claim 29, wherein the bracket, the first fixed support and the second fixed support are formed as an integrally molded unitary structure.

31. An optical scanner as in claim 28, wherein the first and second portions of the resilient non-metallic element form an angle therebetween.

32. An optical scanner as in claim 31, wherein said angle is 90°.

33. An optical scanner as in claim 27, further comprising a printed circuit board supporting the light source, the rotatable pivot, the means for initiating oscillatory motion, and the at least one fixed support.

34. An optical scanner as in claim 27, wherein said resilient non-metallic element comprises a leaf spring consisting of a flexible plastic material.

35. An optical scanner as in claim 34, wherein said flexible plastic material is Mylar.

36. An optical scanner as in claim 27, wherein said optical component comprises a mirror.

37. A system for reading an optically encoded symbol, comprising:
a stationary support;
emitting and optics means for emitting a beam of light and optically directing the beam of light toward a surface on which the optically encoded symbol appears;
oscillatory support means carried by the stationary support for mounting a component of the emitting and optics means for oscillating movement about a pivot axis;
drive means for producing oscillating motion of the component mounted on the oscillatory support means;
at least one fixed mounting means attached to the stationary support;
a planar resilient non-metallic element connected to the at least one fixed mounting means and coupled to the oscillatory support means, for producing biasing forces opposing the oscillating motion of the component produced by said drive means; and
means for receiving light reflected back from the surface and producing electrical signals corresponding to differing light reflectivity of the optically encoded symbol.

38. A system as in claim 37, wherein the stationary support comprises a printed circuit board.

39. A system as in claim 37, wherein the planar resilient non-metallic element comprises a leaf spring consisting of a flexible plastic material.

40. A system as in claim 39, wherein said flexible plastic material is Mylar.

41. A system as in claim 37, wherein:
the at least one fixed mounting means comprises a first fixed support and a second fixed support attached to the stationary support at points spaced apart from each other,
a first portion of the planar resilient non-metallic element extends from the first fixed support to the oscillatory support means, and
a second portion of the resilient non-metallic element extends from the oscillatory support means to the second fixed support.

42. A system as in claim 41, further comprising a bracket mounted on the stationary support, wherein the first and second fixed supports are attached to said bracket.

43. A system as in claim 42, wherein the bracket, the first fixed support and the second fixed support are formed as an integrally molded unitary structure.

44. A system as in claim 41, wherein the first and second portions of the resilient non-metallic element subtend an angle therebetween.

45. A system as in claim 37, wherein the oscillatory support means comprises a post rotatable about said pivot axis, said post supporting said component of the emitting and optics means.

46. A system as in claim 45, further comprising an arm attached to and extending out from said post, wherein said drive means comprises means for applying oscillatory forces to a distal end of said arm.

47. A system as in claim 46, wherein the means for applying oscillatory forces to the distal end of said arm comprises first and second magnets one of which is a permanent magnet and the other of which is an electromagnet to which an alternating drive signal is applied,
the first magnet being fixedly attached to the distal end of said arm, and
the second magnet being mounted on the stationary support in close proximity to the first magnet, such that application of the alternating drive signal to the electromagnet generates a magnetic field which produces oscillating forces on the permanent magnet.

48. A system for reading an optically encoded symbol, comprising:
emitting and optics means for emitting a beam of light and optically directing the beam of light toward the optically encoded symbol;
oscillatory support means for mounting a component of the emitting and optics means for oscillating movement about an axis;
drive means for producing oscillating motion of the component mounted on the oscillatory support means;
a planar resilient non-metallic element coupled to the oscillatory support means and extending away from the axis, for producing biasing forces opposing the oscillating motion of the component mounted on the oscillatory support means produced by said drive means and for absorbing shock forces; and
means responsive to light reflected back from the optically encode symbol for producing electrical signals corresponding to differing light reflectivity of the optically encoded symbol.

* * * * *